US006758625B1

(12) United States Patent
Lawrence

(10) Patent No.: US 6,758,625 B1
(45) Date of Patent: Jul. 6, 2004

(54) MOUNTING DEVICE

(75) Inventor: Paul Lawrence, Singapore (SG)

(73) Assignee: Lisus International PTE LTD (SG)

( * ) Notice: Subject to any disclaimer, the term of this patent is extended or adjusted under 35 U.S.C. 154(b) by 0 days.

(21) Appl. No.: 09/831,485

(22) PCT Filed: Nov. 10, 1998

(86) PCT No.: PCT/SG98/00089

§ 371 (c)(1), (2), (4) Date: Jul. 30, 2001

(87) PCT Pub. No.: WO00/28167

PCT Pub. Date: May 18, 2000

(51) Int. Cl.[7] .................................................. F16B 1/00
(52) U.S. Cl. ...................................................... 403/388
(58) Field of Search ................................ 403/299–301, 403/240, 408.1, 388; 411/178, 369, 383, 533, 542; 285/139.1, FOR 143

(56) References Cited

U.S. PATENT DOCUMENTS

| | | | | | |
|---|---|---|---|---|---|
| 932,395 | A | * | 8/1909 | Kenney | 411/214 |
| 985,853 | A | * | 3/1911 | Stewart | 285/139.1 |
| 1,138,574 | A | * | 5/1915 | King et al. | 411/243 |
| 3,190,332 | A | * | 6/1965 | Bernard | 383/96 |
| 3,316,952 | A | * | 5/1967 | Hollinger | 411/301 |
| 3,531,142 | A | * | 9/1970 | Peasley | 285/39 |
| 3,751,999 | A | * | 8/1973 | Jollivet | 285/139.1 |
| 3,803,972 | A | * | 4/1974 | Deutsher | 411/337 |
| 4,310,273 | A | * | 1/1982 | Kirrish | 411/338 |
| 4,875,818 | A | * | 10/1989 | Reinwall | 411/369 |
| 4,981,735 | A | * | 1/1991 | Rickson | 428/36.9 |
| 5,205,692 | A | * | 4/1993 | Kelbert et al. | 411/173 |
| 5,236,272 | A | * | 8/1993 | Hibbard | 403/24 |
| 5,290,071 | A | * | 3/1994 | Rider et al. | 285/39 |
| 5,338,141 | A | * | 8/1994 | Hulsey | 411/375 |
| 5,439,339 | A | * | 8/1995 | Batchelor | 411/407 |
| 5,540,514 | A | * | 7/1996 | Demars et al. | 403/388 |
| 5,957,641 | A | * | 9/1999 | Bogatz et al. | 411/43 |
| 6,126,355 | A | * | 10/2000 | Clover, Jr. | 403/13 |
| 6,138,434 | A | * | 10/2000 | Demars et al. | 52/786.13 |
| 6,347,708 | B1 | * | 2/2002 | Ostergaard | 209/326 |
| 6,430,894 | B1 | * | 8/2002 | Chae et al. | 52/786.1 |

FOREIGN PATENT DOCUMENTS

| | | | | |
|---|---|---|---|---|
| DE | 1609512 | | 11/1972 | |
| DE | 3419104 | | 11/1985 | |
| DE | 19623797 | | 12/1996 | |
| GB | 2 066 402 A | * | 7/1981 | 411/383 |

* cited by examiner

*Primary Examiner*—Robert J. Sandy
*Assistant Examiner*—Ruth C. Rodriguez
(74) *Attorney, Agent, or Firm*—Ostrolenk, Faber, Gerb & Soffen, LLP

(57) ABSTRACT

A mounting device (50) is described for mounting structural double glazing to a building. The mounting device (50) has a first member (1) including a male portion (6) and a second member (2) including a female portion (16). The male portion (6) is adapted to be inserted through a hole (33) in a pane or glass member (31) to be mounted on the building, and to engage with the female portion (16) on the second member (2) located on the other side of the pane of glass (31) from the first member (1). Each of the first and second members (1, 2) have a face portion (11, 17) substantially parallel to and facing each other, and a sealing member comprising an "O"-ring (4) located on the face portion (11, 17) of each of the first and second members (1, 2). Each "O"-ring (4) is adapted to sealingly engage between the first or the second member (1, 2), respectively and a respective face (34, 35) of the pane of glass (31) when the male portion (6) is engaged with the female portion (16), and a mounting means (9) to permit the mounting device (50) to be mounted on the building.

3 Claims, 1 Drawing Sheet

MOUNTING DEVICE

The invention relates to a mounting device and, in particular, a mounting device for mounting a planar member on a supporting structure. The invention is especially useful for mounting structural double glazing units to a supporting structure, such as a building.

Conventional methods of mounting structural double glazing units to buildings have generally necessitated the use of complicated mounting devices. In conventional mounting devices, predrilled holes are formed in both panes of glass and the mounting device extends through both holes and generally terminates in some form of threaded formation. This threaded formation is used to attach the mounting device to a supporting structure on a building and to thereby mount double glazing unit on the building.

However, these conventional mounting devices are generally expensive as they have a large number of parts and use complicated sealing mechanisms to prevent air entering the space between the panes of glass through gaps between the mounting device and the predrilled holes in which the mounting device is located. In addition, it is also necessary to predrill holes in both panes of glass and it is also necessary to ensure that the mounting device seals to both the inner and outer glass panes to prevent entry of air into the space between the glass panes in use.

In accordance with an aspect of the present invention, a mounting device comprises a first member comprising a male portion, a second member comprising a female portion, the male portion being adapted to be inserted through a hole in a planar member to be mounted on a supporting structure, and to engage with the female portion on the second member located on the other side of the planar member from the first member, each of the first and second members having a face portion substantially parallel to and facing each other, and a sealing member comprising an "O"-ring located on the face portion of each of the first and second members which is adapted to sealingly engage between the first or the second member, respectively and a respective face of the planar member when the male portion is engaged with female portion, and a mounting means to permit the mounting device to be mounted on a supporting structure.

Preferably, the planar member is a pane of glass which may form part of a glazing unit. Preferably, the glazing unit is a structural double glazing unit and typically, the mounting device sealingly engages with only one pane of glass on a double glazing unit.

Typically, the male portion comprises a male formation, such as a male thread, and the female portion comprises a female formation such as a female thread.

Typically, the mounting means comprises a mounting formation on the first member. Preferably, the mounting formation comprises a thread formation. Most preferably, the mounting formation comprises a female thread formation on the first member which may be located concentrically within the male portion.

Preferably, the mounting device also comprises a spacer member encircling the male portion and, in use, separates surfaces of the hole in the planar member from the external surface of the male formation.

Typically, where the planar member is a pane of glass forming part of a structural double glazing unit, a hole is predrilled in one pane of glass and the mounting device fixed to the pane of glass through the predrilled hole prior to assembly of the structural double glazing unit.

An example of a mounting device in accordance with the invention will now be described with reference to the accompanying drawings, in which.

Figure 1:
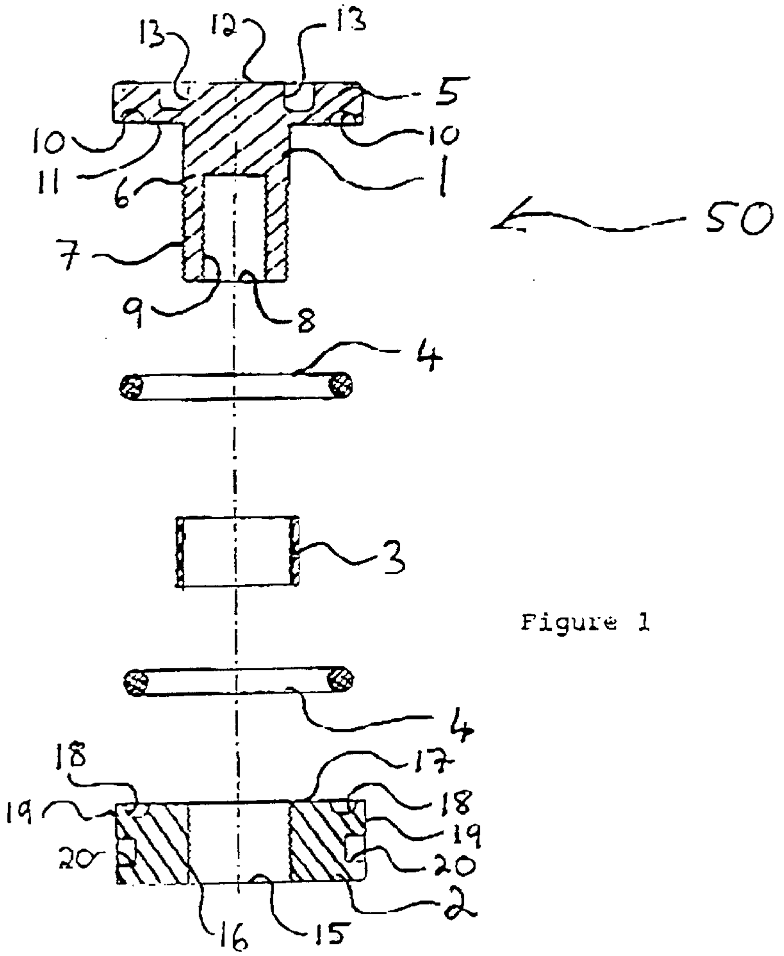
FIG. 1 is an exploded cross-sectional view of a mounting device.

FIG. 1 shows a mounting device 50 comprising a first member 1, a second member 2, a spacer member 3 and two "O"-rings 4.

The first member 1 includes a head portion 5 and a male portion 6. The male portion 6 has an external thread 7 and blind hole 0 with an internal thread 9. The head portion 5 has a circular groove 10 on face 11 of the head portion 5. The groove 10 extends continuously around the male portion 6. Opposite face 12 of the head portion 5 includes two apertures 13 which are located on the head portion 5 diametrically opposite each other.

The second member 2 includes a through aperture 15 with an internal thread 16. Face 17 of the second member 2 has a curved circular groove 18 formed in it which is similar to the circular groove 10 on the first member 1 and extends continuously around the aperture 15. The member 2 also has an outer edge 19 in which two diametrically opposite holes 20 are formed.

Figure 2:
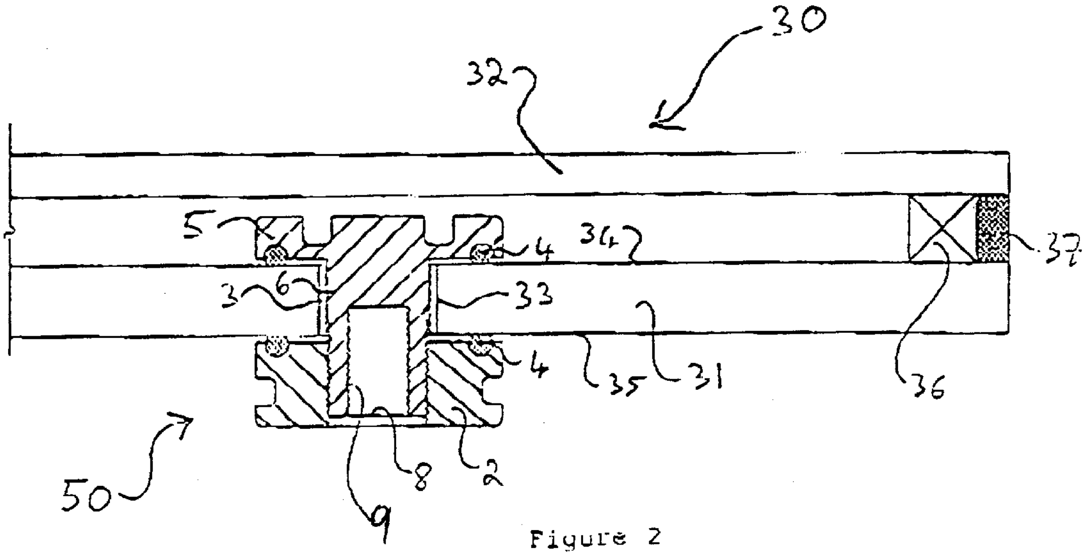
FIG. 2 is a cross-sectional view of a portion of a structural double glazing unit showing the mounting device fitted.

FIG. 2 shows a cross-sectional view of a structural double glazing unit 30 comprising a first pane of glass 31, a second pane of glass 32, a sealing member 36 and a gasket 37. The mounting device 50 is fitted to the pane of glass 31.

In order to fit the mounting device 50 to the pane of glass 31, a hole 33 is first drilled through the pane of glass 31. One of the O rings 4 is then inserted into the circular groove 10 in the first member 1 and the male portion 6 of the first member 1 is inserted through the hole 33 such that the face portion 11 and "O"-ring 4 in groove 10 face surface 34 of the glass pane 31. The spacer 3 is then slid over the male portion 6 and lines the hole 33 in the pane of glass 31 to prevent contact between the male portion 6 and the surfaces of the hole 33.

The other O ring 4 is then inserted into the circular groove 18 in the second member 2 and thread formation 16 on the second member 2 is engaged with the thread formation 7 on the male portion 6 and the second member 2 is screwed onto the male portion 6 with the "O"-ring 4 and face 17 facing surface 35 of the pane of glass 31. The member 2 is then screwed onto the member 1 until the "O"-rings 4 on the first member 1 and the second member 2 compressed against the surfaces 34, 35 of the pane of glass 31. The members 1, 2 are tightened against the pane of glass 31 by using a suitable tools (not shown) with prongs which can be inserted into the holes 13, 20 and then used to rotate the members 1, 2 with respect to each other to compress the "O"-rings 4 against the surfaces 34, 35.

After the mounting device 50 has been fitted to the pane of glass 31, the double glazing unit 30 can then be assembled by joining the second pane of glass 32 to the first pane 31 using the seal 36 and gasket 37.

After the structural double glazing unit 30 has been assembled, it may be fitted to a building by screwing a threaded fitting into hole 8 to engage with the thread 9 and the fitting may then be attached to a building. Typically, a double glazing unit may have four, six or more mounting devices 50 fitted to it so that the double glazing unit 30 is adequately supported in use to the building.

The second pane 32 of the double glazing unit 30 is supported by the seal 36 and gasket 37 which are attached to the first pane 31.

What is claimed is:

1. A mounting device for an insulating glass unit comprising:

a male portion, a female portion, the male portion being adapted to be inserted through a hole in a planar member of the glass unit to be mounted on a supporting structure, and to engage the female portion located on the other side of the planar member from the male portion, each of the male and female portions having a respective face portion, the face portion being substantially parallel to and facing each other;

a respective sealing member comprising an "O"-ring located on the face portion of each of the first and second members and being adapted to sealingly engage between each of the male and female portions and a respective face of the planar member when the male portion is engaged with the female portion a blind hole in the male portion to permit the mounting device to be mounted on a supporting structure; and a spacer encircling the male portion in a manner such that the spacer and the "O"-rings prevent the male portion and the female portion from making direct contact with the planar member.

2. A mounting device according to claim 1, in combination with a pane of glass which constitutes the planar member.

3. A mounting device according to claim 2, wherein the pane of glass comprises part of a structural double pane unit adapted to be mounted to a building, the double pane unit including panes so positioned and the pane unit being configured that the pane unit has a sealed space between the panes thereof; and the face portion being located in a sealed space within the double pane unit.

* * * * *